(12) United States Patent
Kolmanovsky et al.

(10) Patent No.: US 6,553,949 B1
(45) Date of Patent: Apr. 29, 2003

(54) ENGINE KNOCK PREVENTION SYSTEM AND METHOD

(75) Inventors: Ilya V Kolmanovsky, Ypsilanti, MI (US); Julia Helen Buckland, Dearborn, MI (US); Jeffrey Arthur Cook, Dearborn, MI (US); Jing Sun, Bloomfield Township, MI (US)

(73) Assignee: Ford Global Technologies, Inc., Dearborn, MI (US)

(*) Notice: Subject to any disclaimer, the term of this patent is extended or adjusted under 35 U.S.C. 154(b) by 47 days.

(21) Appl. No.: 09/799,279

(22) Filed: Mar. 5, 2001

(51) Int. Cl.⁷ ............................. F02P 5/152; F02B 75/04
(52) U.S. Cl. ..................... 123/48 B; 123/406.21; 123/406.29
(58) Field of Search ................ 123/48 R, 48 A, 123/48 AA, 48 B, 48 C, 48 D, 406.21, 406.29, 564, 73 AC, 78 R, 78 A, 78 AA, 78 B, 78 BA, 78 C, 78 D, 78 E, 78 F

(56) References Cited

U.S. PATENT DOCUMENTS

| | | | |
|---|---|---|---|
| 4,860,711 A | * | 8/1989 | Morikawa ............. 123/48 D |
| 4,958,606 A | | 9/1990 | Hitomi et al. |
| 5,255,637 A | | 10/1993 | Schechter |
| 5,819,702 A | | 10/1998 | Mendler |
| 5,845,613 A | | 12/1998 | Yoshikawa |

FOREIGN PATENT DOCUMENTS

| | | | |
|---|---|---|---|
| JP | HI-100327 | | 4/1989 |
| JP | 01100327 A | * | 4/1989 |

* cited by examiner

Primary Examiner—Andrew M. Dolinar
Assistant Examiner—Arnold Castro
(74) Attorney, Agent, or Firm—Allan J. Lippa; John D. Russell

(57) ABSTRACT

A system and a method for improving engine performance by utilizing a variable compression ratio mechanism and a boosting mechanism are presented. The performance is improved by coordinating the control of ignition timing, compression ratio, and engine boosting while at the same time minimizing engine knock, preventing undesirable interaction, and providing optimal fuel economy. According to the present invention, adjusting ignition timing and compression ratio can be done either sequentially or concurrently.

18 Claims, 16 Drawing Sheets

Embodiment Showing Selection of Spark Timing and Compression ratio for Optimal Fuel Economy

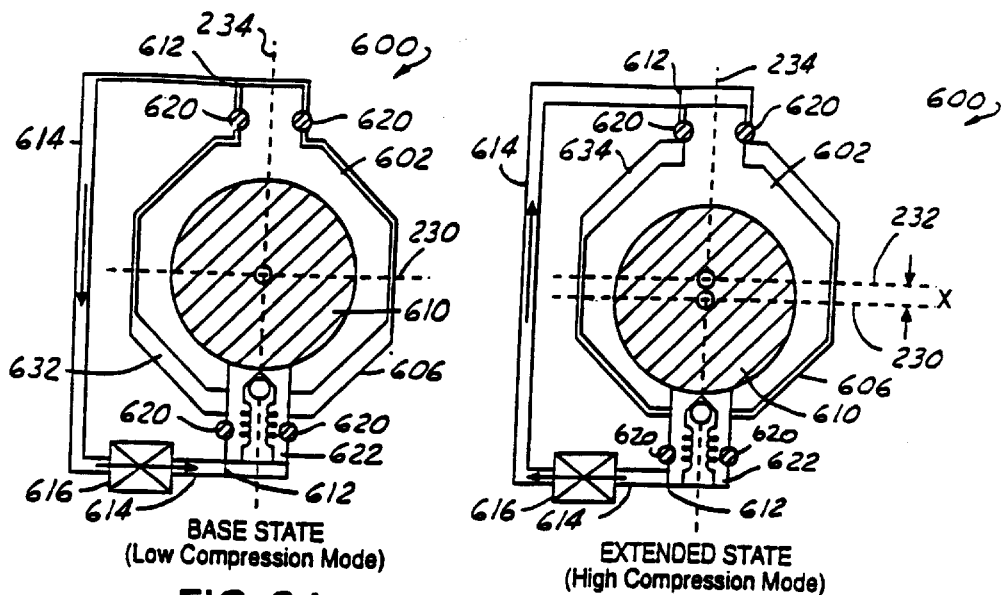
BASE STATE
(Low Compression Mode)
FIG. 6A
EXTENDED STATE
(High Compression Mode)
FIG. 6B
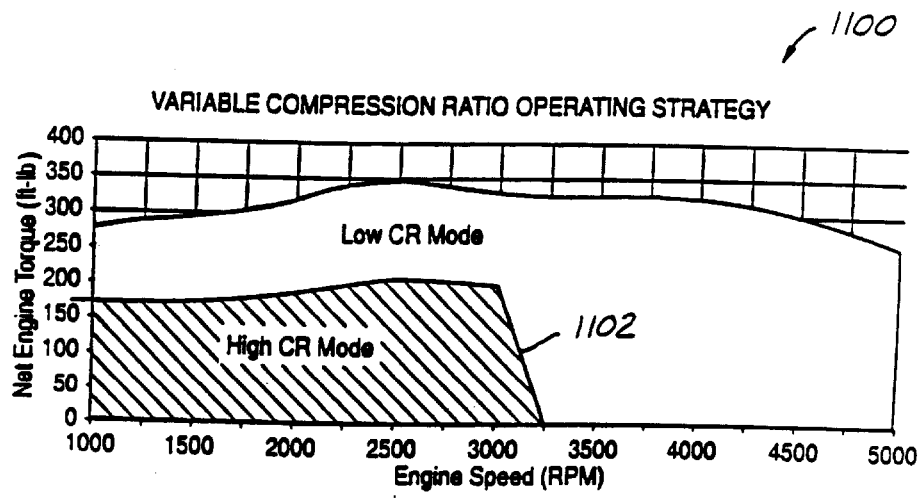
FIG. 11

FIG. 17 Control System For Engine With Compression Ratio

Alternate Embodiment For An Engine With Knock Sensor

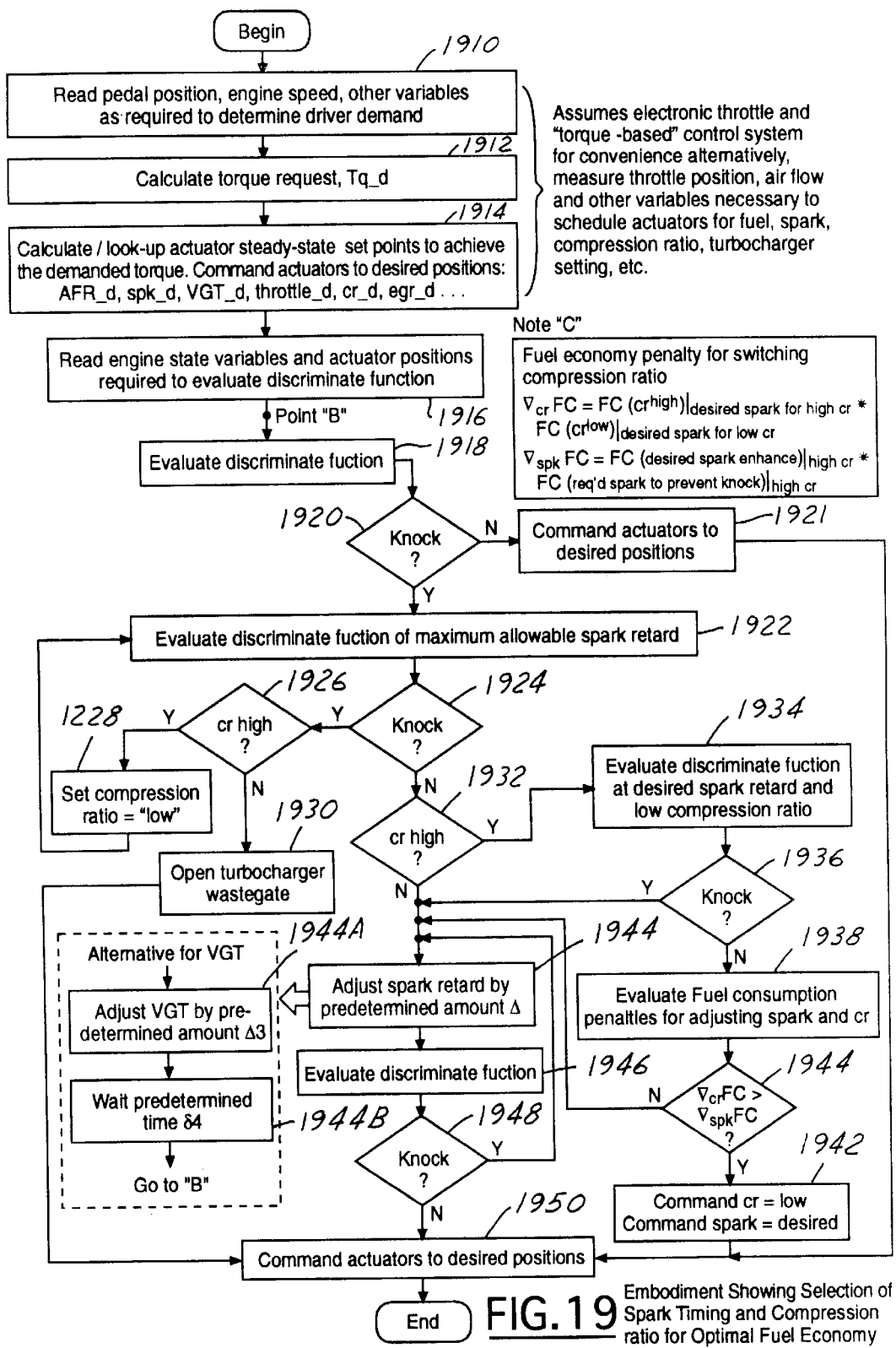
FIG. 19 Embodiment Showing Selection of Spark Timing and Compression ratio for Optimal Fuel Economy

ENGINE KNOCK PREVENTION SYSTEM AND METHOD

FIELD OF THE INVENTION

The present invention relates to a control system for an internal combustion engine utilizing a variable compression ratio mechanism and boosting mechanism to improve engine performance.

BACKGROUND OF THE INVENTION

Engines utilize various devices to improve fuel economy. For example, engines can include mechanisms for varying compression ratio and boosting devices for increasing manifold pressure.

In one example (U.S. Pat. No. 5,819,702), turbocharging is used and compression ratio is lowered at high power levels to prevent engine knock. Alternatively, no turbocharging is used and compression ratio is increased at low power levels. In another example (U.S. Pat. No. 5,845,613), an engine controller adjusts intake valve opening timing to prevent engine knock where the engine includes boosting.

The inventors herein have recognized a disadvantage with approaches that attempt to prevent engine knock using compression ratio. For example, using compression ratio to avoid knock can cause excessive hunting between various amounts of compression since varying compression ratio can affect engine breathing, which in turn also affects knock. This can lead to degraded drivability and increased emissions.

Further, the inventors herein have recognized that such approaches can create even further disadvantages. For example, when adjusting compression ratio, different ignition timing may be needed to provide peak efficiency. However, this adjustment in ignition timing may again lead to knock. Thus, compression ratio is further adjusted. Such an approach can thus actually lead to degraded efficiency and performance.

SUMMARY OF THE INVENTION

The above disadvantages are overcome by a system comprising an engine having a variable compression ratio mechanism and a controller. The controller indicates potential for engine knock; adjusts ignition timing in response to said indication when said engine is operating in a first region; and adjusts compression ratio of said compression ratio mechanism in response to said indication when said engine is operating in a second region.

By using different actuators to prevent engine knock in different regions, it is possible to minimize disadvantageous interaction between the actuators and thus provide improved engine performance.

In another aspect of the present invention, the controller adjusts ignition timing when engine ignition timing is retarded less than a first predetermined value and adjusts compression ratio of said compression ratio mechanism when engine ignition timing is retarded greater than a second predetermined value.

Thus, in one example according to the present invention, ignition timing can be used to prevent engine knock until the timing reaches a predetermined retard amount. Then, if there is still a potential for knock, compression ratio can be used. In this way, disadvantageous interaction between these two mechanisms is minimized and improved engine operation results.

In another aspect of the present invention, a boosting apparatus is coupled to the engine. Then, the controller adjusts compression ratio when ignition timing is retarded greater than a first predetermined value and adjusts said boosting apparatus when ignition timing is retarded greater than a second predetermined value and compression ratio of said variable compression ratio is less than a third predetermined value.

In this way, it is possible to coordinate the action of three devices, each of which can be controlled to prevent engine knocking.

Note that there are various types of compression ratio mechanisms as well as various types of boosting devices that can be used according to the present invention. For example, compression ratio can be adjusted by varying piston head height or connecting rod length, or any other such method. Further, boosting can be provided by turbocharging, turbocharging with intercooling, or supercharging.

Also note that there are various methods of specifying different operating regions. For example, these regions may be based on engine speed, engine airflow, ignition timing, engine torque, engine temperature, or various other parameters, as described later herein. Finally, note that there are various ways to adjust parameters, including increasing, decreasing, gradually changing, abruptly stepping, engaging, or discontinuing.

BRIEF DESCRIPTION OF THE DRAWINGS

For a complete understanding of the present invention and the advantages thereof, reference is now made to the following description, taken in conjunction with the accompanying drawings in which like reference numbers indicate like features, and wherein:

FIGS. 6A and 6B are diagrams showing the operation of an exemplary variable compression ratio apparatus in accordance with a preferred embodiment of the present invention;

FIG. 11 is a plot showing an exemplary variable compression ratio operating strategy in accordance to a preferred embodiment of the present invention;

FIGS. 17–19 are high-level flowcharts illustrating the invention.

DESCRIPTION OF THE INVENTION

Figure 1:
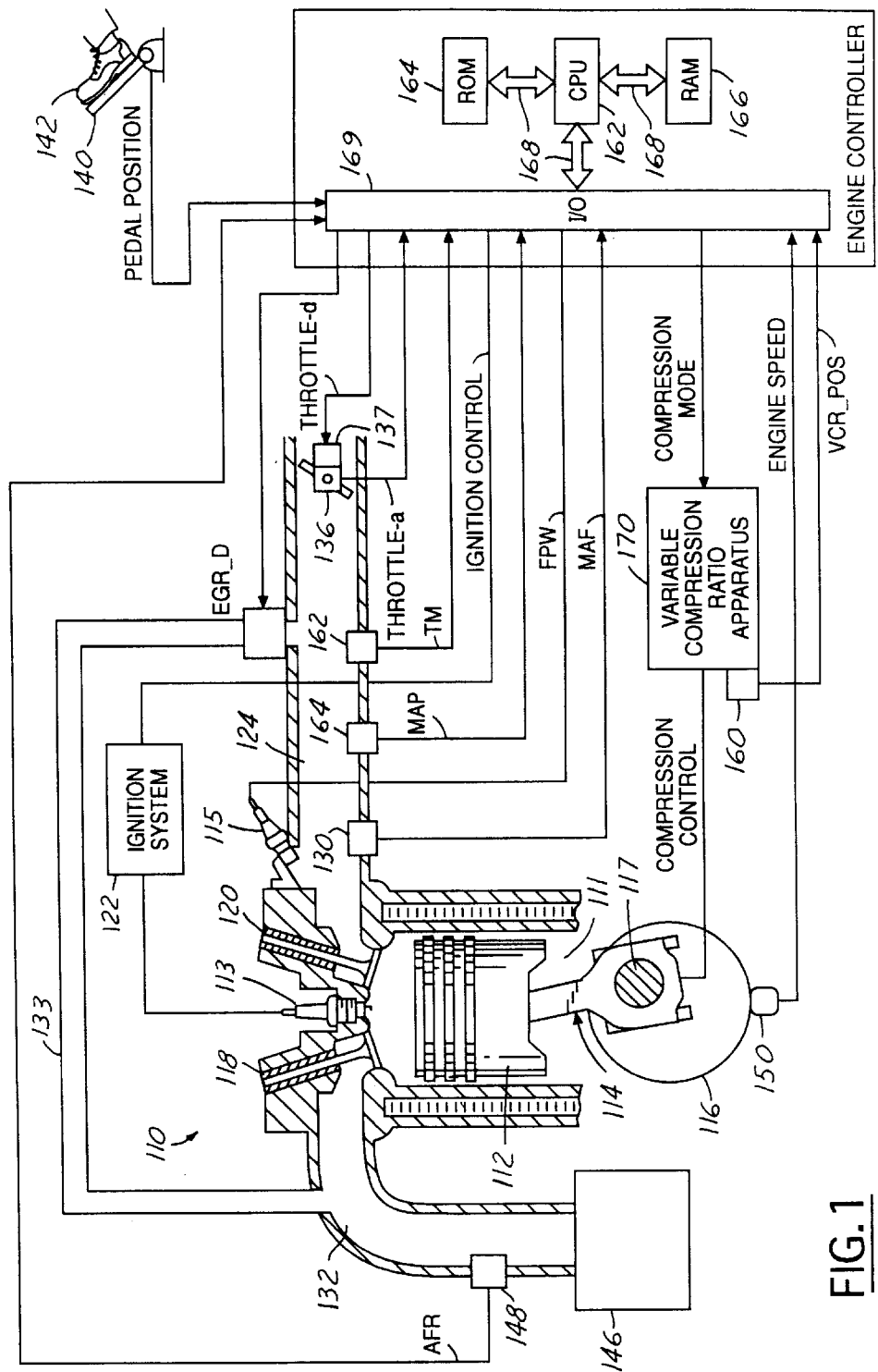
FIG. 1 is a diagram of an exemplary system for varying the compression ratio of an internal combustion engine.

FIG. 1 shows a diagram of a system for operating a variable compression ratio internal combustion engine in accordance with a preferred embodiment of the present invention. The engine 110 shown in FIG. 1, by way of example and not limitation, is a gasoline four-stroke port fuel injection (PFI) internal combustion engine having a plurality of cylinders (only one shown), each of the cylinders having a combustion chamber 111 and corresponding fuel injector 115, spark plug 113, intake manifold 124, exhaust manifold 132, and reciprocating piston 112. The engine 110, however, can be any internal combustion engine, such as a direct fuel injection (DFI) or diesel engine, having one or more reciprocating pistons as shown in FIG. 1. Each piston of the internal combustion engine is coupled to a fixed-length connecting rod 114 on one end, and to a crankpin 117 of a crankshaft 116. Also, position sensor 160 is coupled to compression ratio mechanism 170 for measuring compression ratio position.

Exhaust manifold 132 is coupled to an emission control device 146 and exhaust gas sensor 148. Emission control device 146 can be any type of three-way catalyst, such as a NOx adsorbent having various amounts of materials, such as precious metals (platinum, palladium, and rhodium) and/or barium and lanthanum. Exhaust gas sensor 148 can be a linear, or full range, air-fuel ratio sensor, such as a UEGO (Universal Exhaust Gas Oxygen Sensor), that produces a substantially linear output voltage versus oxygen concentration, or air-fuel ratio. Alternatively, it can be a switching type sensor, or HEGO (Heated Exhaust Gas Oxygen Sensor). EGR tube 133 coupled exhaust manifold 132 to intake manifold 124. EGR control valve 133 controls exhaust flow flowing in tube 133 from exhaust manifold 132 to intake manifold 124 according to a desired EGR control signal (egr_d). Further, throttle 136 is positioned coupled to intake manifold 124. Throttle 136 can be mechanically coupled to pedal 140. However, in this example, it is electronically controlled by throttle motor 137. Throttle 136 is controlled to a desired position (throttle_d) using feedback control via throttle position sensor (throttle_a). Also, as described later herein with particular reference to FIG. 16, a boosting device can be coupled to engine 110.

The reciprocating piston 112 is further coupled to a compression ratio mechanism 170 that is operated by an electronic engine controller 160 to vary the compression ratio of the engine. "Compression ratio" is defined as the ratio of the volume in the cylinder 111 above the piston 112 when the piston is at bottom-dead-center (BDC) to the volume in the cylinder above the piston 112 when the piston 112 is at top-dead-center (TDC). In general terms, the compression ratio mechanism 170 is operated to effect a change in the engine's compression ratio in accordance with one or more parameters, such as engine load and speed, as shown by way of example in FIG. 11. Such parameters are measured by appropriate sensors, such as a speed (RPM) sensor 150, mass air flow (MAF) sensor 130, pedal position sensor 140, compression ratio sensor 160, manifold temperature sensor 162, and manifold pressure sensor (164), which are electronically coupled to the engine controller 160. The compression ratio mechanism 170 will be discussed in further detail below with reference to FIGS. 2A through 10.

Referring again to FIG. 1, the engine controller 160 includes a central processing unit (CPU) 1162 having corresponding input/output ports 169, read-only memory (ROM) 164 or any suitable electronic storage medium containing processor-executable instructions and calibration values, random-access memory (RAM) 166, and a data bus 168 of any suitable configuration. The controller 160 receives signals from a variety of sensors coupled to the engine 110 and/or the vehicle, and controls the operation of the fuel injector 115, which is positioned to inject fuel into a corresponding cylinder 111 in precise quantities as determined by the controller 160. The controller 160 similarly controls the operation of the spark plugs 113 (ignition timing or spark retard).

Figures 2A, 2B:
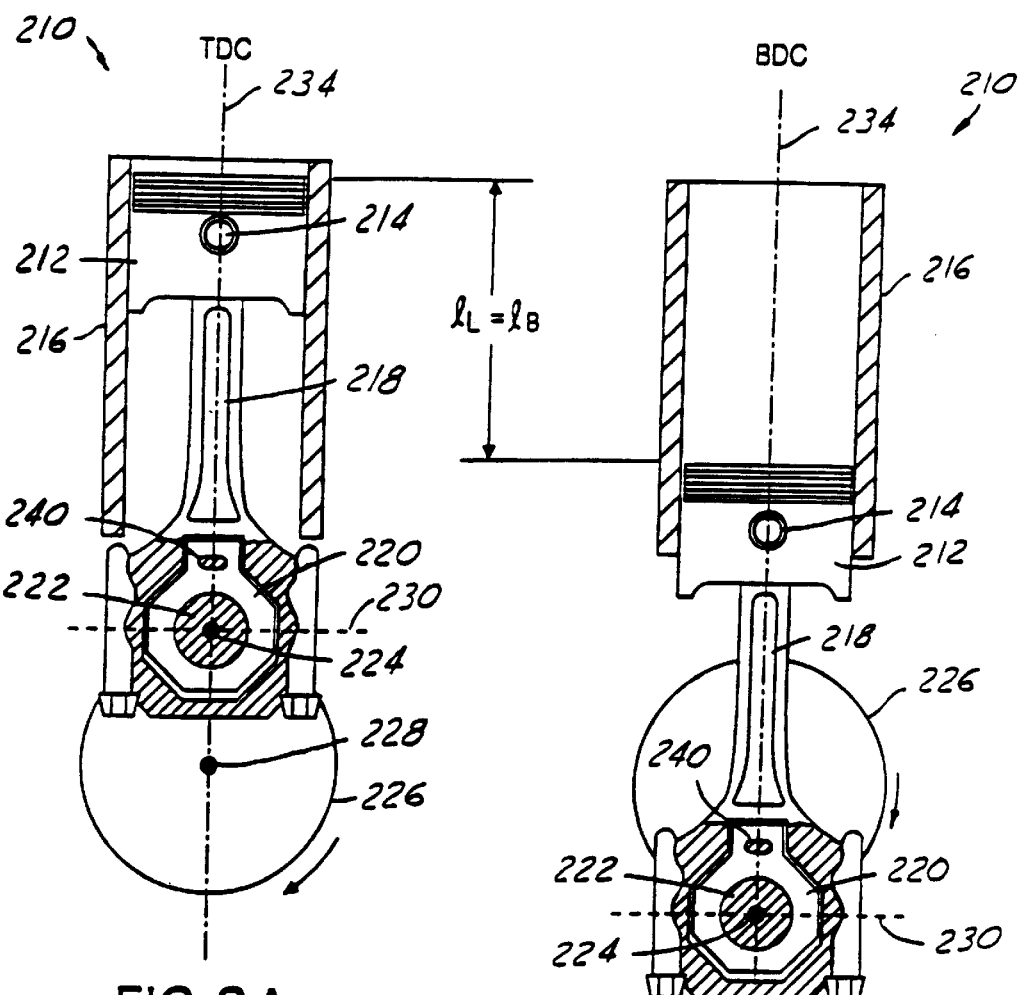
FIGS. 2A and 2B are diagrams showing low compression ratio operation of an internal combustion engine having a variable compression ratio apparatus in accordance with a preferred embodiment of the present invention.
Figures 3A, 3B:
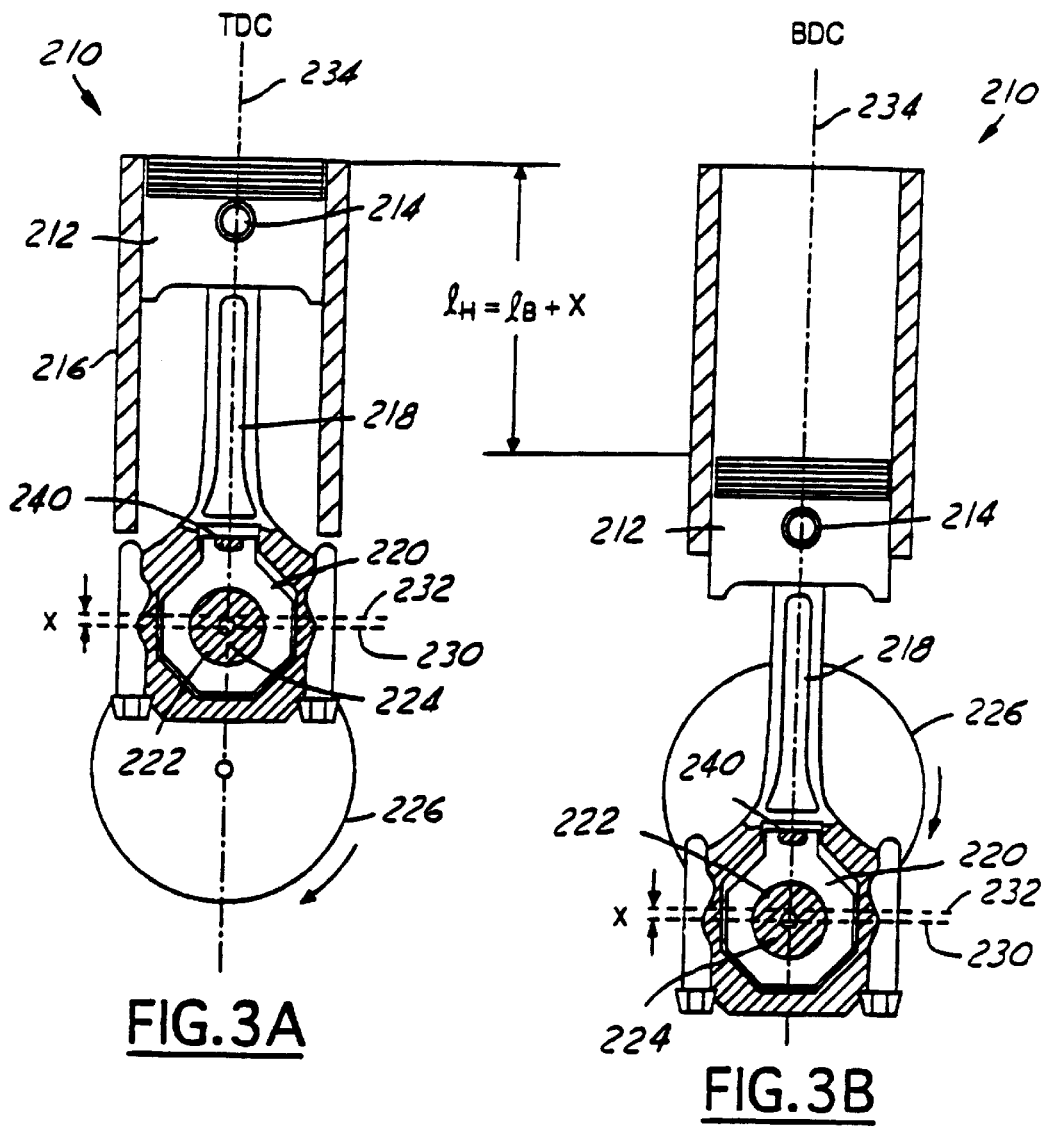
FIGS. 3A and 3B are diagrams showing high compression ratio operation of an internal combustion engine having a variable compression ratio apparatus in accordance with a preferred embodiment of the present invention.

FIGS. 2A through 3B are diagrams illustrating the operation of an internal combustion engine having the variable compression ratio apparatus (variable compression ratio mechanism) of FIGS. 2A of the present invention and 2B show the piston 212 top-dead-center (TDC) and bottom-dead-center (BDC) positions, respectively, corresponding to a "baseline" or "un-extended" position of a connecting rod 218. The compression mechanism as shown, for example, in the cut-away portions of FIGS. 2A and 2B, includes a bearing retainer 220 disposed between the connecting rod 218 and a crankpin 222, the crankpin having a centerline axis 224 extending in and out of the page and parallel to the axis of rotation 228 of a corresponding crankshaft 226. The bearing retainer 220 has a centerline axis 230 normal to the crankpin centerline axis 224, and, likewise, the connecting rod 218 has a centerline axis (shown as 232 in FIGS. 3A and 3B). When the connecting rod 218 is in the baseline position, as shown in FIGS. 2A and 2B, which herein corresponds to a low compression ratio mode of the internal combustion engine, the bearing retainer centerline axis 230 is coincident or substantially coincident with the connecting rod centerline axis 232. When the connecting rod is in an extended, high compression ratio mode position, as shown in FIGS. 3A and 3B, the bearing retainer centerline axis 230 is displaced with respect to centerline axis 232 of the connecting rod.

As further shown in FIGS. 4A through 5B, the bearing retainer 220 in accordance with the present invention includes an inner surface in communication with the crankpin 222 and an outer surface selectively slidable relative to the connecting rod 218. The outer surface of the bearing retainer is moveable with respect to the connecting rod 218 in a linear fashion along a longitudinal axis 234 extending between the first and second ends of the connecting rod 218. The connecting rod centerline axis is thus selectively displaced with respect to the bearing retainer centerline axis, thus causing a change in the effective length of the connecting rod and the compression ratio of the internal combustion engine. Therefore, as illustrated in FIGS. 2A through 3B, the effective length of the connecting rod $l_L$ during low compression ratio operation is equal to the baseline, un-extended length $l_B$ of the connecting rod, and the effective length of the connecting rod $l_H$ is equal to the extended length $l_B+x$ of the connecting rod during high compression ratio operation.

FIGS. 4A through 5B show exploded and non-exploded perspective views of preferred embodiments of a connecting rod and compression ratio apparatus in accordance with the present invention. The preferred embodiments are provided by way of example and are not intended to limit the scope of the invention claimed herein. Further detailed embodiments of the connecting rod and compression ratio apparatus can be found in co-pending U.S. application Ser. Nos. 09/691,668; 09/690,946; 09/691,669; and 09/682,465, all of which are hereby incorporated by reference in their entirety.

Figure 4A:
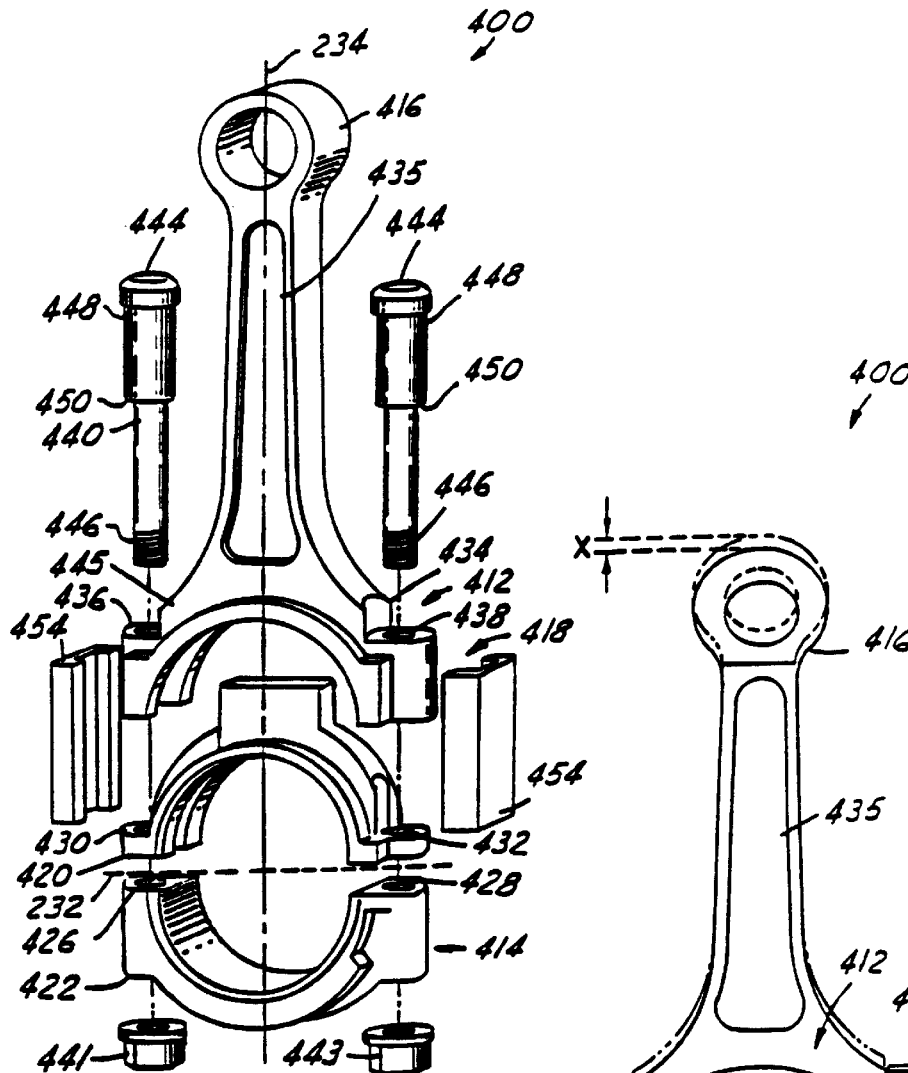
FIGS. 4A and 4B are exploded and non-exploded perspective views, respectively, of a connecting rod and variable compression ratio apparatus in accordance with the present invention.
Figure 4B:
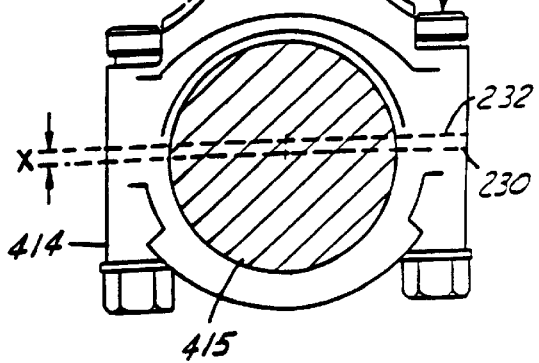

Referring to FIGS. 4A and 4B, exploded and non-exploded perspective views are provided, respectively, of a connecting rod and variable compression ratio apparatus in accordance with the present invention. The connecting rod 400 includes a first or so-called "large" end 412 for journaling on a crank pin 415 of a crankshaft, and a second so-called "small" end 416 for journaling on a central portion of a wrist pin (not shown) and for coupling the connecting rod 400 to a piston (not shown). A compression ratio apparatus 418 is embodied in the connecting rod at its large end for varying the effective length of the connecting rod as measured between the large and small ends 412 and 416.

In accordance with the present embodiment of FIGS. 4A and 4B, the large end 412 further includes an upper cap 420 and a lower cap 422 that are fastened together around the crank pin 415. Lower cap 22 includes parallel through-holes 426 and 428 at opposite ends of its semi-circumference. At opposite ends of its semi-circumference, upper cap 420 includes through-holes 430 and 432 that align with holes 426 and 427, respectively, when the two caps 420 and 430 are in communication with the crank pin.

Connecting rod 412 further includes a part 434 containing a connecting rod portion 435. One end of part includes the small end 416, and the opposite end is coupled through the compression ratio mechanism 418 with large end 412. The coupling of the compression ratio mechanism and the large end 412 is preferably implemented using through-holes 436 and 438 that align with through-holes 430 and 432, respectively, fasteners 440 and 442, and nuts 441 and 443. Through-holes 436 and 438 are disposed mutually parallel, and are disposed in free ends of curved arms 445 that extend from connecting rod portion 435.

Each fastener 440 and 442 includes a head 444 disposed at a proximal end and a screw thread 446 disposed at a distal end. Intermediate proximal and in distal ends, each fastener includes a circular cylindrical guide surface 448. The parts are assembled in the manner indicated by FIG. 4A with the respective fastener shanks passing though respective aligned through-holes 436 and 430, 438 and 432, and 426 and 428; and threading into respective nuts 441 and 443. The diameters of through-holes 436 and 438 are larger than those of through-holes 430 and 432 to allow shoulders 450 at the ends of guides 448 to bear against the margins of through-holes 430 and 432. As the fasteners and nuts are tightened, such as by turning with a suitable tightening tool, the two caps 420 and 422 are thereby forced together at their ends, crushing the crank pin bearing in the process and thereby forming a bearing retainer structure around the crank pin.

The axial length of each guide surface 448, as measured between head 444 and shoulder 450, is slightly greater than the axial length of each through-hole 436 and 438, and the diameters of the latter are slightly larger than those of the former to provide sliding clearance. In this way, it becomes possible for the rod part 434 to slide axially, i.e., the outer surface of the combined 420/430 assembly is axially movable relative to the connecting rod, over a short range of motion relative to the large end 412 along a longitudinal axis 234 extending between the large and small ends of the connecting rod. The range of motion is indicated in FIG. 4B by the displacement x of a connecting rod centerline 232 with respect to a centerline 230 of the assembled caps 420 and 430. The displacement x of the two centerline axes thus translates into a change x in length of the connecting rod assembly 400. When arms 445 abut part 420 around the margins of through-holes 30 and 32, the connecting rod assembly 400 has a minimum or "baseline" length corresponding to a low compression ratio mode of operation for the internal combustion engine. When arms 445 abut heads 444, the connecting rod assembly 400 has a maximum or extended length corresponding to a high compression ratio operation of the internal combustion engine.

As further shown in FIGS. 4A and 4B, channels 454 may be assembled at the sides of the connecting rod assembly 400 to provide additional bearing support for the axial sliding motion of the connecting rod. Mechanism 418 may include passive and/or active elements for accomplishing overall length change, and resulting compression ratio change.

Figures 5A, 5B:
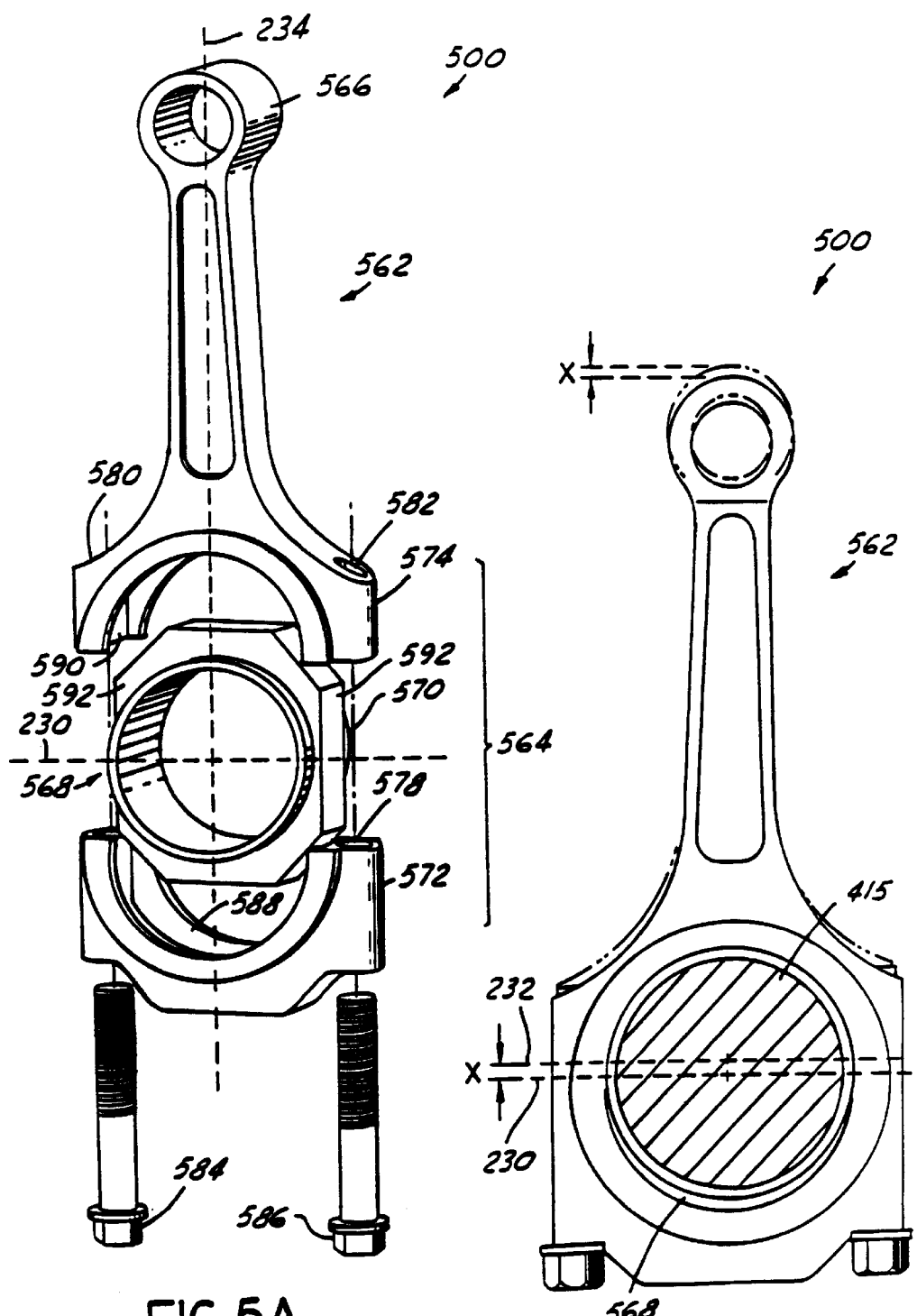
FIGS. 5A and 5B are exploded and non-exploded perspective views, respectively, of a connecting rod and variable compression ratio apparatus in accordance with another preferred embodiment of the present invention.

FIGS. 5A and 5B are exploded and non-exploded perspective views, respectively, of another embodiment of a connecting rod and compression ratio mechanism in accordance with the present invention. As shown in FIGS. 5A and 5B, a connecting rod 500 comprises a large end 564 for journaling on a crank pin 415 of a crankshaft (not shown) and a small end 566 for journaling on a central portion of a wrist pin (not shown) for coupling the connecting rod 500 to a piston (not shown). The compression ratio mechanism 568 is embodied in this case entirely within the large end 564 of the connecting rod 500 to provide for variation in the overall length between the large and small ends of the connecting rod.

Mechanism 568, in accordance with the present invention, is provided by a single-piece bearing retainer 570, which is captured between a cap 572 and one end of a rod part 574. Opposite ends of the semi-circumference of cap 572 contain holes 576 and 578 that align with threaded holes 580 and 582 in rod part 574. Fasteners 584 and 586 fasten the cap to the rod part. The cap and rod part have channels 588 and 590 that fit to respective portions of a flange 592 of bearing retainer 570. The channel and flange depths are chosen to allow the assembled cap and rod part to move axially a short distance on the bearing retainer, thereby changing the overall length, as marked by x in FIG. 5B. Mechanism 568 may comprise passive and/or active elements for accomplishing overall length change and corresponding compression ratio change. The channels form the groove, and the flange the tongue, of a tongue-and-groove type joint providing for sliding motion that adjusts the length of the connecting rod assembly.

FIGS. 6A and 6B are schematic diagrams showing the operation of an exemplary compression ratio mechanism 600 in accordance with a preferred embodiment of the present invention. In FIGS. 6A and 6B, the compression ratio mechanism 600 includes a unitary bearing retainer 602 having post portions 621 and 622 disposed on opposite ends of the main bearing retainer along the longitudinal axis 234 of the connecting rod. Note, only a cut-out, inner profile 606 of the connecting rod is shown in FIGS. 6A and 6B. When the compression ratio mechanism of the present invention is assembled within the inner profile of the connecting rod, the mechanism is actuated from a low compression ratio position as shown in FIG. 6A to a high compression ratio position as shown in FIG. 6B, and vice-versa, by actuating the bearing retainer via a hydraulic or electromechanical system coupled to and/or within the connecting rod. A hydraulic system, having openings 612 and conduits 614, is provided for enabling the flow of oil or other suitable fluid to and from each of the post regions so as to move the entire bearing retainer from one position to another. A check valve 616 is also provided for controlling the flow of oil used to position the connecting rod relative to the bearing retainer.

In order for the connecting rod to move from an extended state to the baseline state, the rod must be in compression, e.g., during the combustion stroke of a four-stroke internal combustion engine, and the check valve 620 must be positioned so as to allow the flow of oil into the lower reservoir 632 formed between the inside of the connecting rod and the bearing retainer. The check valve allows oil to move from the upper reservoir 634 to the lower reservoir 632. In this manner, the connecting rod is locked in the baseline position until the check valve is moved.

In order for the VCR to move back to the extended position, the rod must be in tension, e.g., during the intake stroke of a four-stroke internal combustion engine, and the check valve 620 must be positioned so as to allow the flow of oil from the lower reservoir 632 to the upper reservoir 634. In this manner, the connecting rod remains locked in the extended, high compression ratio position.

In the present embodiment, a positive oil pressure, combined with inertial forces on the connecting rod, is used to extend or retract the connecting rod as required to yield the desired compression ratio. Further, the positive oil pressure is used to maintain or "lock" the connecting rod in the desired position. FIGS. 7 through 10, discussed below, show alternative embodiments of the compression ratio mechanism having one or more hydraulically or electromechanically actuated locking mechanisms for maintaining the effective length of the connecting rod as required.

Figure 7:
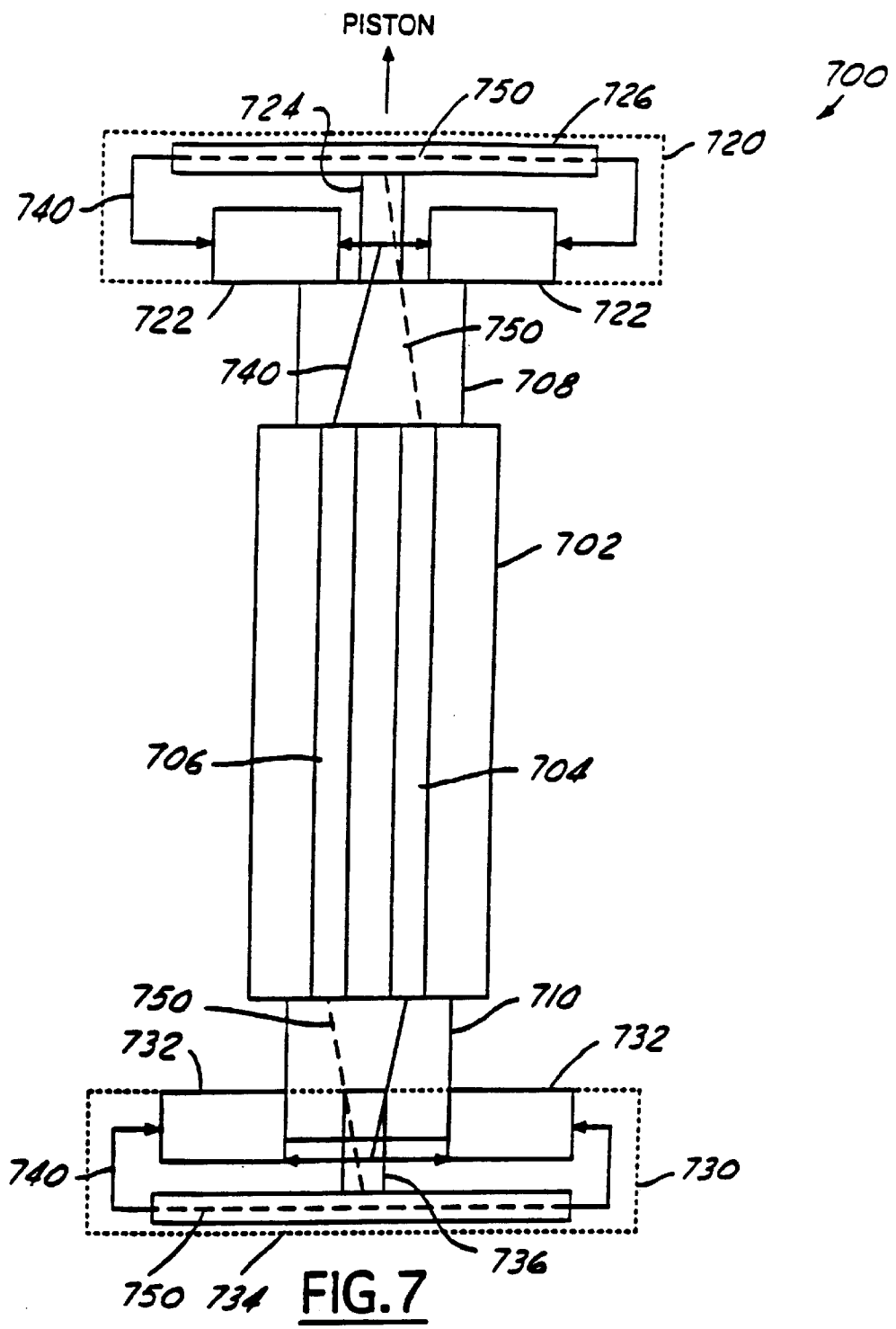
FIG. 7 is a diagram showing the operation of an exemplary variable compression ratio apparatus having two locking mechanisms in accordance with a preferred embodiment of the present.

FIG. 7 is a diagram showing the operation of an exemplary compression ratio apparatus having two locking mechanisms 722 and 732 in accordance with a preferred embodiment of the present. The mechanism further includes a bearing retainer having a main body portion 702 in contact with a corresponding crankpin, an upper post portion 708, a lower post portion 710, and oil conduits 704 and 706 for providing passageways for a high-pressure oil line 740 and a low pressure oil line 750. The elements or portions thereof, shown within boxes 720 and 730, are preferably housed within the large end of the connecting rod adjacent to the corresponding post portions 708 and 710 of the bearing retainer.

The locking mechanisms shown in FIG. 7 are held in their current positions using the low "lubrication" oil pressure line 750 and transitioned to the next position using the high-pressure oil line 740. The high-pressure line 740, which is represented in FIG. 7 as a solid line, is used for transitioning the connecting rod to the next position. This is accomplished using high-pressure pulses on line 740 that cause the elements of the locking mechanisms 722 and 732 either to compress or move apart so as to allow compression or tension forces on the connecting rod to transition the rod to a high compression ratio mode position or low compression ratio mode position. The low oil pressure line 750, in contrast, is used to maintain the locking pins 722 and 732 in their positions after corresponding high-pressure pulses have been provided to displace the centerline axis of the connecting rod. Preferably, a single high-pressure pulse on high-pressure line 740 causes the lock pin already in the "locked" position, for example mechanism 722 shown in FIG. 7, to expand and thus unlock while at time causing the opposing lock mechanism 732 to compress and remain in a locked position after the connecting rod shifts in the direction away from the piston. As shown in FIG. 7, the operation of the compression ratio apparatus thus corresponds to a transition from high compression ratio mode to low compression ratio mode.

Note, as with all of the preferred embodiments of the present invention, it is understood that the compression ratio apparatus of the present invention can be adapted accordingly to transition between more than two compression ratio states. For example, the compression ratio apparatus can be designed accordingly to transition between three or more compression ratio states, i.e., high, medium, and low compression ratio states.

Note, also, that the control methods of the present invention, described later herein with respect to FIGS. 11 and 16A–19, can be used with any of the above compression ratio mechanisms, or any other mechanism, which varies the compression ratio of the engine. Further, the methods of the present invention are applicable to mechanisms that provide a continuously variable range of compression ratios. While certain combinations of the methods described herein and different mechanical embodiments may provide synergistic results, the inventors herein have contemplated using the control methods with any mechanism that can change the effective engine compression ratio.

Figure 8:
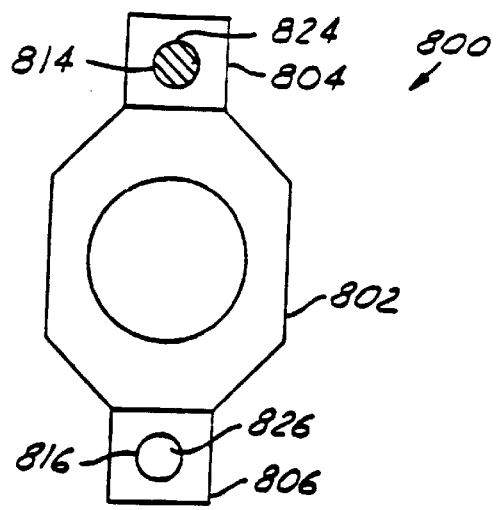
FIG. 8 is a diagram of an exemplary variable compression ratio apparatus having two opposing locking mechanisms and corresponding through-holes.
Figure 9A:
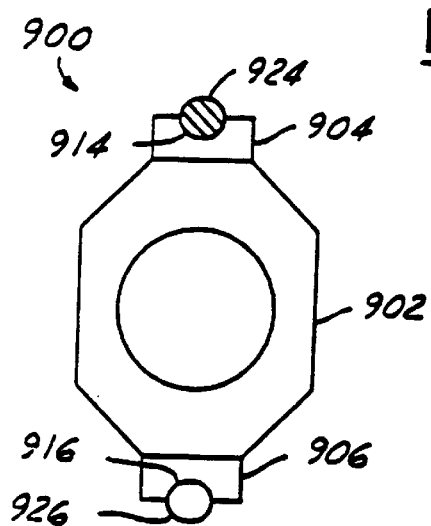
FIGS. 9A and 9B are diagrams of exemplary variable compression ratio apparatuses having two opposing locking mechanisms and corresponding channels.
Figure 9B:
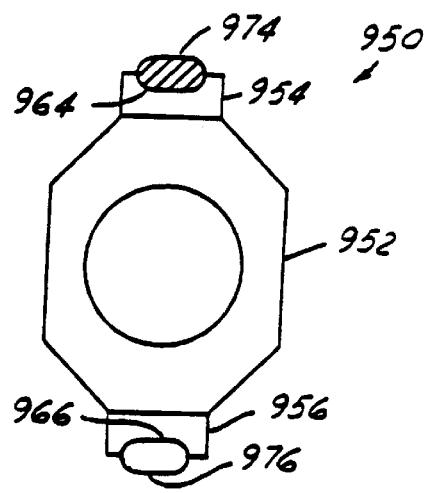
Figure 10:
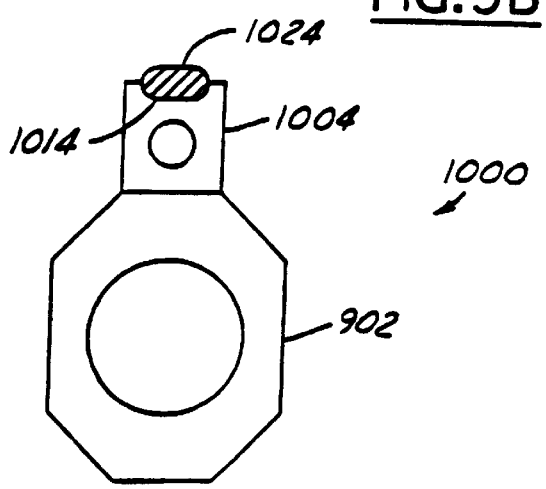
FIG. 10 is a diagram of an exemplary variable compression apparatus having a single locking mechanism and a corresponding channel.

FIGS. 8 through 10 show alternative embodiments of the locking mechanisms for the compression ratio apparatus of the present invention. FIG. 8 is a diagram of an exemplary variable compression apparatus having two opposing locking mechanisms 824 and 826 and corresponding through-holes 814 and 816 formed through post portions 804 and 806. Lock mechanism 814, shown in FIG. 8 as a shaded region, is shown to be in a locked position. Preferably, both mechanisms are cylindrically shaped pins suitably designed to withstand the inertial forces exerted via the connecting rod during operation of the engine.

FIG. 9A shows a similar embodiment, as shown in FIG. 8, except that locking mechanisms 924 and 926 are arranged and constructed to cooperate with corresponding channels 914 and 916 formed on the upper and lower sides of the post portions 904 and 906, respectively. An additional embodiment is also shown in FIG. 9B, except that the locking mechanisms are flattened cylindrical pins 974 and 976 having correspondingly shaped channels 964 and 966 formed on post portions 954 and 956. FIG. 10 shows an embodiment similar to the embodiment of FIG. 9B, except that only one post 1004 and corresponding locking mechanism/channel 1024/1014 are provided.

FIG. 11 is a plot showing an exemplary compression ratio map 1100 for use with the various compression ratio apparatuses described above. The map 1100 shows the baseline operating strategy for a variable compression ratio internal combustion engine, and is implemented by the electronic engine controller of FIG. 1. The baseline mapping, which is embodied in computer readable program code and corresponding memory, is used to operate an internal combustion engine in accordance with high and low compression ratio modes 1102 and 1104, respectively, depending on the detected operating speed and load of the internal combustion engine. The baseline mapping determines when the compression modes are to be switched. There are various other ways in which the compression ratio may be scheduled, such as, for example, based on engine coolant temperature, time since engine start, pedal position, desired engine torque, or various other parameters, or as described later herein with respect to FIGS. 16A–19.

Figure 12:
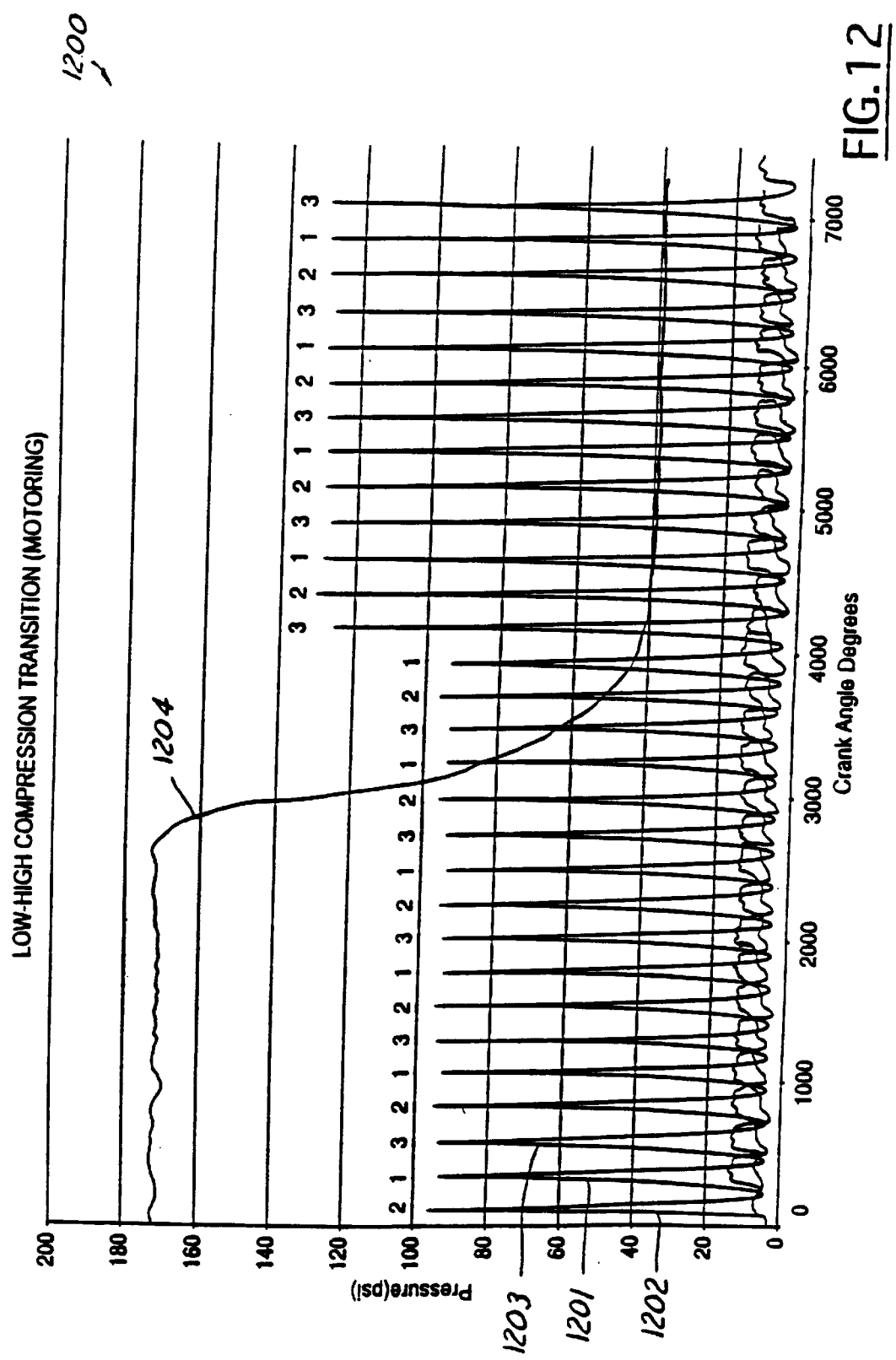
FIGS. 12 and 13 are plots of cylinder and oil pressure versus crank angle degrees during the motoring of an exemplary variable compression ratio internal combustion engine arranged and constructed in accordance with the present invention.
Figure 13:
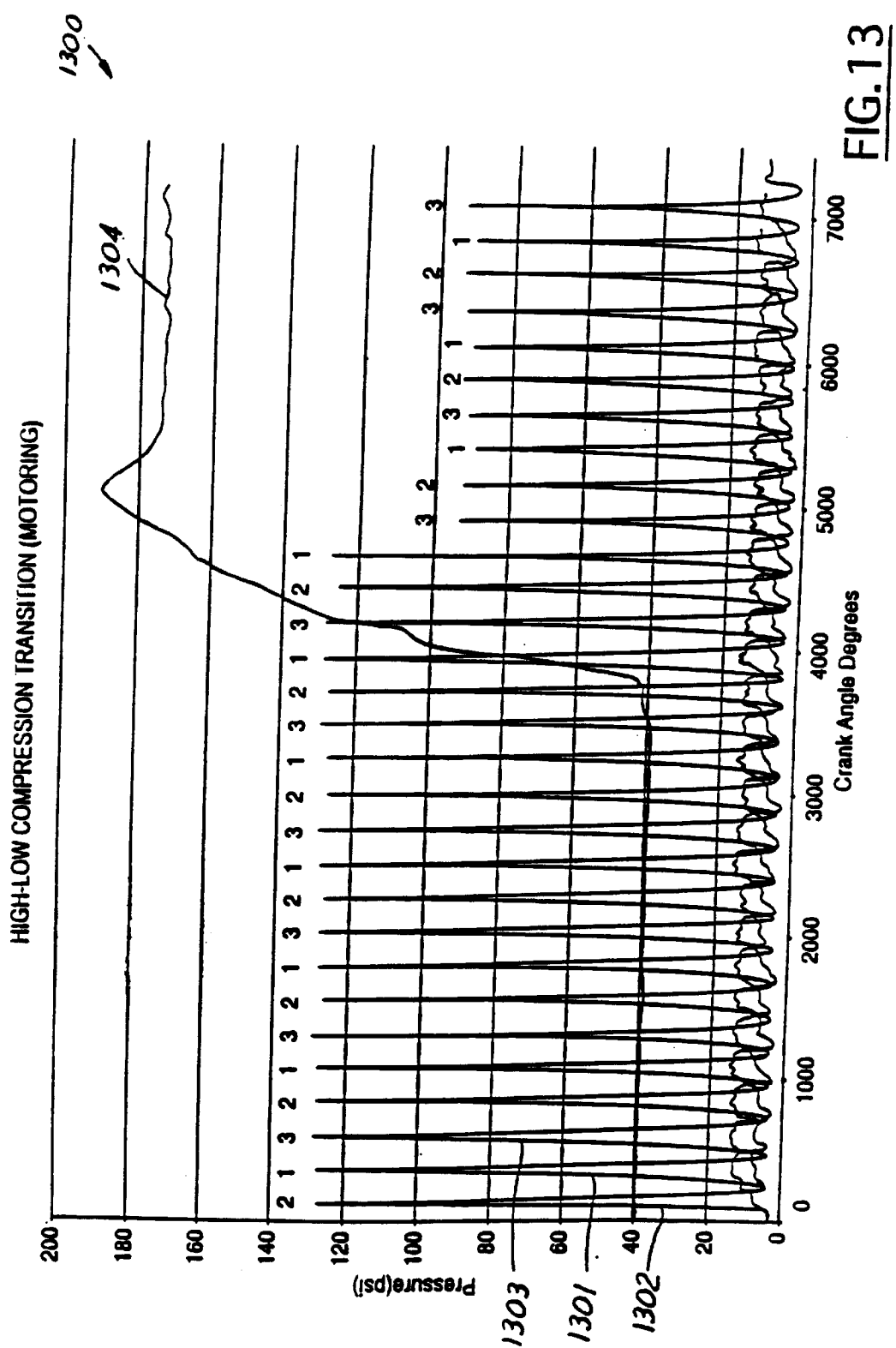
Figure 14:
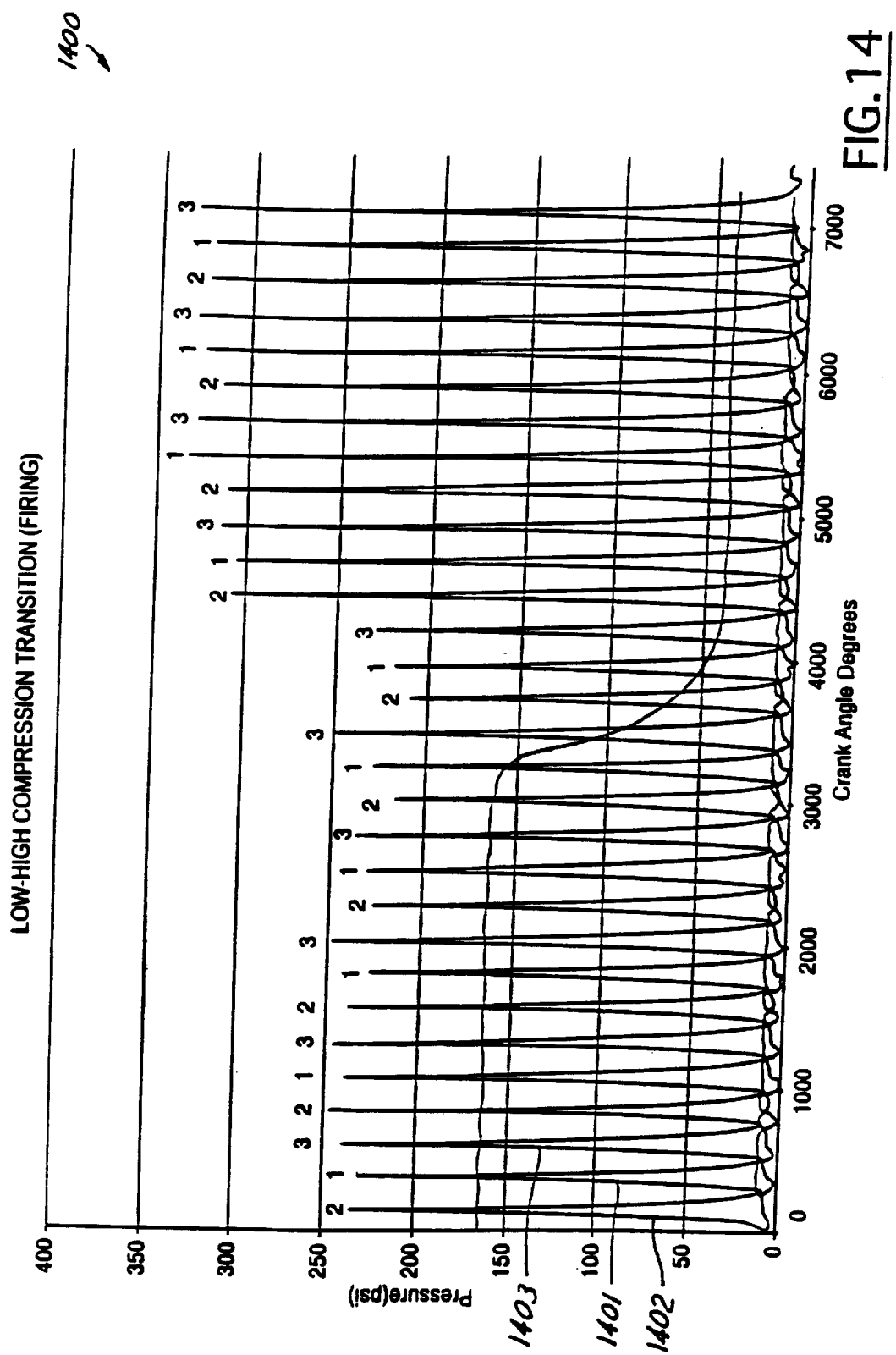
FIGS. 14 and 15 are plots of cylinder and oil pressure versus crank angle degrees during the firing of an exemplary variable compression ratio internal combustion engine arranged and constructed in accordance with the present invention.
Figure 15:
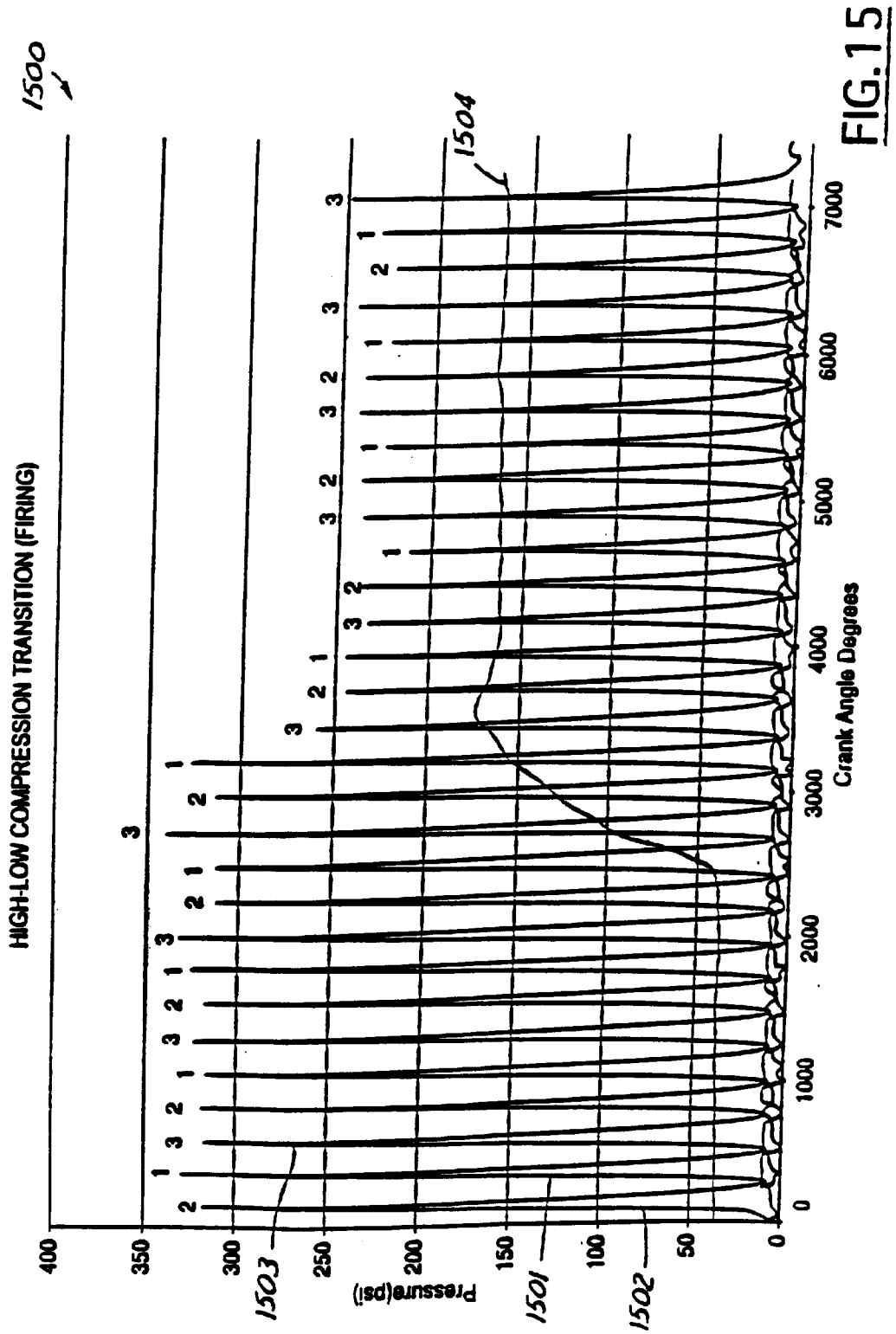

FIGS. 12 through 15 are plots of cylinder and oil pressure versus crank angle degrees for a three-cylinder, four-stroke variable compression ratio gasoline internal combustion engine. FIGS. 12 and 13 correspond to low-to-high and high-to-low compression mode transitions, respectively, and show plots of cylinder and oil pressure during motoring. FIGS. 14 and 15 also correspond to low-to-high and high-to-low compression mode transitions, respectively, and show plots of cylinder and oil pressure during firing. FIGS. 12 through 15 show pressure plots 1201–1203, 1301–1303, 1401–1403 and 1501–1503 for each of the cylinders (plots also labeled "1", "2" and "3") and "galley" oil pressure plots 1204, 1304, 1404 and 1504. Operating conditions include a nominal engine speed of 1500 rpm (1500 rpm, 2.62 bar brake mean effective pressure (BMEP) for firing cylinders) with an oil temperature of approximately 120 degrees F. and an engine coolant temperature of approximately 150 degrees F.

The plots 1200 through 1500 shown in FIGS. 12 through 15 correspond to an engine having compression ratio apparatuses requiring a relatively high oil pressure, nominally greater than 100 psi, for maintaining the connecting rods in a low compression ratio operating mode, and a relatively low oil pressure, nominally less than 100 psi, for maintaining the connecting rods in a high compression ratio operating mode. The actual values of the oil pressure levels and relation to compression ratio modes however is not intended to limit the scope of the present invention. As indicated by the plots, once the galley oil pressure reaches a threshold level, the connecting rods transition within a single engine cycle to the commanded position. The transitions in FIGS. 12 and 14 result in high compression mode operation, and the transitions in FIGS. 13 and 15 result in low compression mode operation.

Accordingly, embodiments of a compression ratio apparatus have been described having a bearing retainer in cooperation with a connecting rod wherein the centerline axis of the connecting rod is displaced quickly and reliably with respect to the centerline axis of the bearing retainer to effect a change in the length of the connecting rod, thereby selectively causing a change in the compression ratio of the internal combustion engine. The transition from one compression ratio mode to another is accomplished in a linear fashion without requiring the rotation of an eccentric ring member as shown by the prior art. The compression ratio can be actuated in accordance with any suitable control strategy using a suitable hydraulic or electromechanical system. In a preferred embodiment, the engine's oil system is used to actuate the mechanism to produce a selected compression ratio for the internal combustion engine.

FIGS. 16–19 describe various control methods, which can be used with, or independently of, the control methods described above.

Figure 16A:
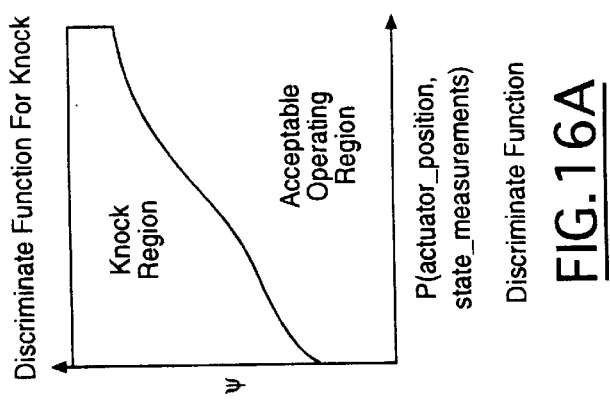
FIG. 16A is a graph of an engine control function.
Figure 16:
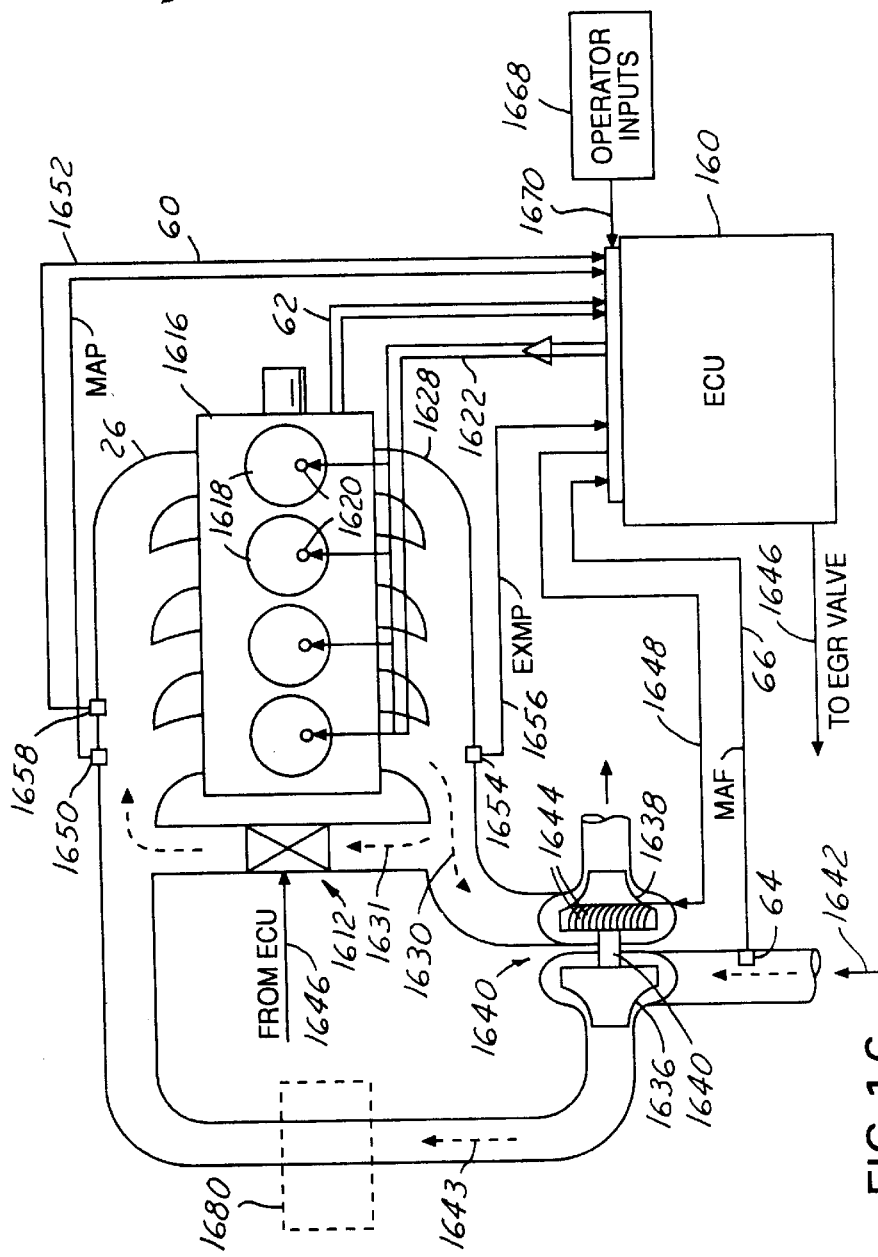
FIG. 16 is a schematic diagram of an exemplary system.

FIG. 16 shows an alternative embodiment where engine 110 has a boosting device. For convenience, some of the signals described above with respect to FIG. 1 have been deleted. However, those skilled in the art will recognize, in view of this disclosure, and combination of components from FIGS. 1 and 16 can be used according to the present invention. Turning now specifically to FIG. 16, there is shown a simplified schematic diagram of an engine 110 having an exhaust gas recirculation (EGR) system 1612 and a boosting device (variable geometry turbocharger (VGT) 1614). Note, in an alternative embodiment, a turbocharger having a waste gate can be employed in place of the VGT. A representative engine block 1616 is shown having four combustion chambers 1618. Each of the combustion chambers 1618 includes a direct-injection fuel injector 1620. The duty cycle of the fuel injectors 1620 is determined by the engine control unit (ECU) 160 and transmitted along signal line 1622. Air enters the combustion chambers 1618 through the intake manifold 1626, and combustion gases are exhausted through the exhaust manifold 1628 in the direction of arrow 1630.

To reduce the level of NOx emissions, the engine is equipped with an EGR system 1612. The EGR system 1612 comprises a conduit 1632 connecting the exhaust manifold 1628 to the intake manifold 1626. This allows a portion of the exhaust gases to be circulated from the exhaust manifold 1628 to the intake manifold 1626 in the direction of arrow 1631. An EGR valve 1634 regulates the amount of exhaust gas recirculated from the exhaust manifold 1628. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 1614 uses exhaust gas energy to increase the mass of the air charge delivered to the engine combustion chambers 1618. The exhaust gas flowing in the direction of arrow 1630 drives the turbocharger 1614. This larger mass of air can be burned with a larger quantity of fuel, resulting in more torque and power as compared to naturally aspirated, non-turbocharged engines.

The turbocharger 1614 consists of a compressor 1636 and a turbine 1638 coupled by a common shaft 1640. The exhaust gas 1630 drives the turbine 1638 which drives the compressor 1636, which, in turn, compresses ambient air 1642 and directs it (arrow 1643) into the intake manifold 1626. The VGT 1614 can be modified as a function of engine speed during engine operation by varying the turbine flow area and the angle at which the exhaust gas 1630 is directed at the turbine blades. This is accomplished by changing the angle of the inlet guide vanes 1644 on the turbine 1638.

All of the engine systems, including the EGR 1612, VGT 1614 and fuel injectors 1620, are controlled by the ECU. For example, signal 1646 from the ECU regulates the EGR valve position, and signal 1648 regulates the position of the VGT guide vanes 1644.

In the ECU, the command signals 1646, 1648 to the EGR 1612 and VGT 1614 actuators are calculated from measured variables and engine operating parameters by means of a control algorithm. Sensors and calibratable lookup tables residing in ECU memory provide the ECU with engine operating information. For example, an intake manifold pressure (MAP) sensor 1650 provides a signal 1652 to the ECU indicative of the pressure in the intake manifold 1626. Likewise, exhaust manifold pressure (EXMP) sensor 1654 provides a signal 1656 to the ECU indicative of the pressure in the exhaust manifold 1628. Further, an intake manifold temperature sensor 1658 provides a signal 1660 to the ECU indicative of the intake manifold temperature. A mass airflow (MAF) sensor 1664 also provides a signal 1666 indicative of the compressor mass airflow to the ECU.

Additional sensory inputs are also received by the ECU along signal line 1662 such as engine coolant temperature, engine speed, and EGR valve position. Additional operator inputs 1668 are received along signal 1670, such as the accelerator pedal position or other fueling request input, as described above herein. Further, an intercooler 1680 can be coupled between the boosting device and the engine as shown.

Referring now to FIG. 16A, a graph is shown illustrating discriminate function for indicating whether or not there is a potential for engine knock. Discriminate function accepts measurements and estimates of engine operating parameters (state_measurements) and estimates and measurements of actuator positions (actuator_positions), and classifies operating points as either "knocking" or "not knocking". The discriminate function is generated from engine testing and can be implemented in various methods, including look-up tables, a neural network, a polynomial function, or a statistical distribution. Further, those skilled in the art will recognize in view of this disclosure that there are other methods of classifying engine operating conditions. For example, engine knock may be measured using in-cylinder pressure transducers, engine block mounted accelerometers, or other devices. The following flow charts describe computation and control actions for either measured or estimated knock and potential or actual knock.

Thus, engine operating parameters can be used to indicate the potential for engine knock. As described above, this includes an indication that engine knock is imminent or an actual measurement that engine knock is currently occurring.

Figure 17:
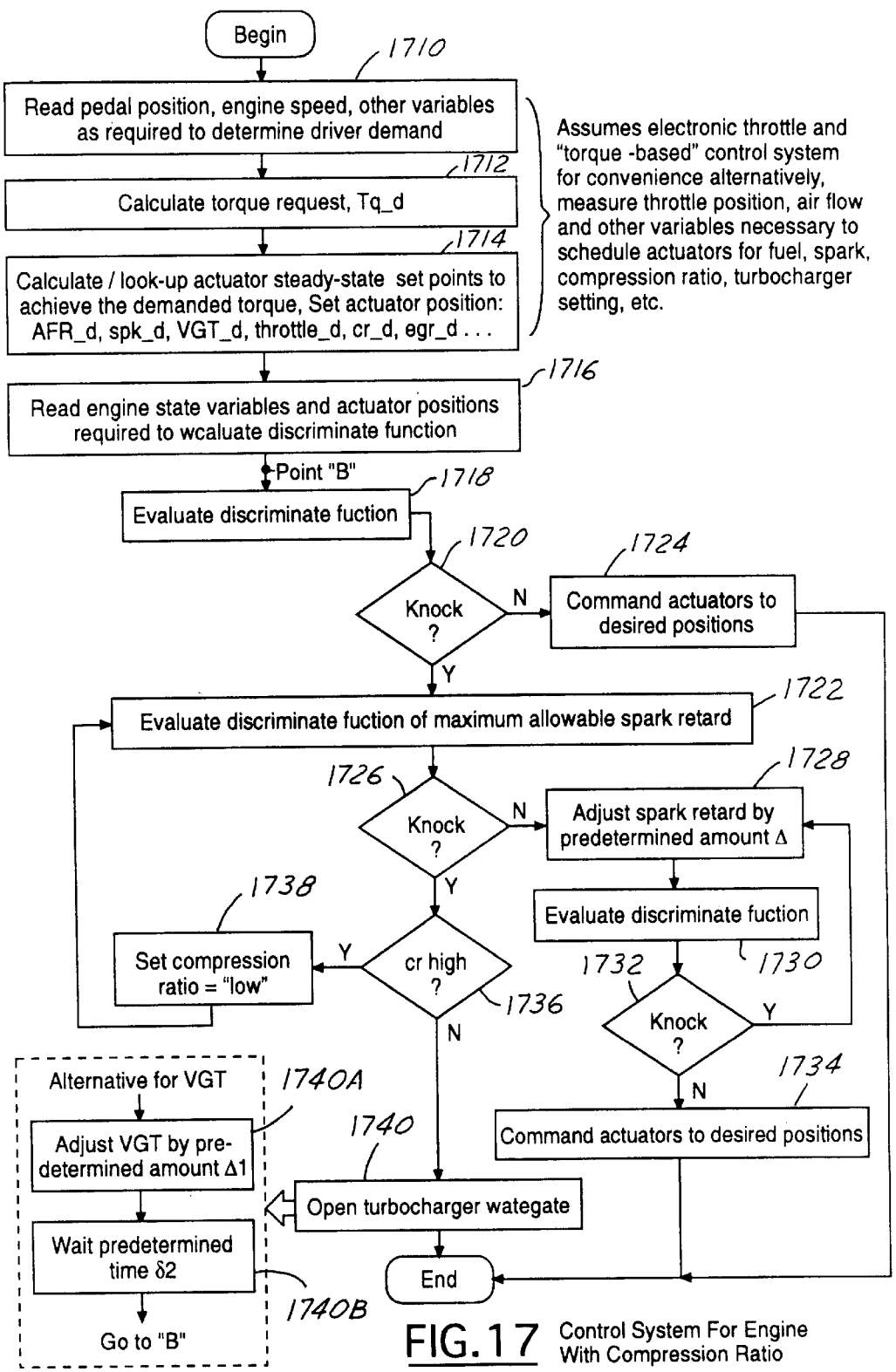

Referring now to FIG. 17, a control method is described for engines with variable compression ratio. First, in step 1710, various parameters are read to determine driver demand. For example, pedal position and engine speed are used to calculate a driver demand. Then, in step 1712, a torque request (TQ_D) is calculated based on the determined driver demand. Then, in step 1714, actuator steady-state set points are determined that achieve the demanded calculated torque (TQ_D). Actuator commands to these desired positions are then determined. For example, a desired air/fuel ratio (afr_d), a desired ignition timing (spk_d), a desired boosting position (vgt_d) [if equipped], a desired throttle opening (throttle_d) [if equipped], a desired compression ratio (cr_d), a desired exhaust gas recirculation amount (egr_d) [if equipped], and various other parameters, are determined.

Those skilled in the art will recognize that the above described steps (1710, 1712, and 1714) assume that an electronic throttle and a torque based control system are used. However, those skilled in the art will recognize that if such a system is not used, actuator set points can be determined based on throttle position, air flow, and other variables. Next, in step 1716, the engine state variables and actuator positions that are required to evaluate discriminate function are read. Then, in step 1718, the discriminate function is evaluated. In step 1720, a determination is made as to whether the discriminate function has indicated the potential for knock (see FIG. 16A). If the answer to step 1720 is no, then in step 1724 the actuators are commanded to the desired position.

Alternatively, if the answer to step 1720 is yes, then some adjustment to desired values should be taken to minimize any engine knock and the routine continues to step 1722. In step 1722, the discriminate function is evaluated at a maximum allowable spark retard. Then, a determination is made in step 1726 as to whether there is still a potential for knock. In other words, the routine first determines whether knock can be abated using ignition timing retard without adjusting compression ratio or the boosting device.

When the answer to step 1726 is no, the routine adjusts spark retard by predetermined amounts (Δ) in step 1728. Then, in step 1730, the discriminate function is evaluated. In step 1732, a determination is made as to whether there is still a potential for engine knock. If the answer to step 1732 is yes, the routine returns to step 1728 and further adjusts spark retard by a predetermined amount Δ. Otherwise, when the answer to step 1732 is no, the actuators are commanded to adjusted desired positions in step 1734. Thus, when engine knock can be abated using spark retard (ignition timing), desired spark is gradually retarded until there is no potential for engine knock.

However, when the answer to step 1726 is no, this indicates that engine knock cannot be abated using ignition timing alone. Thus, a determination is made in step 1736 as to whether the engine is currently operating in a high compression ratio. If the answer to step 1736 is yes, then the desired compression ratio is set to a low compression ratio amount in step 1738. The routine then continues to step 1722 to again evaluate the discriminate function at maximum allowable spark retard. Thus, according to the present invention, when engine knock cannot be abated using ignition timing alone, the desired compression ratio is adjusted to a lower compression ratio.

When the answer to step 1736 is no, the routine continues to step 1740 to adjust the boosting device. In particular, in step 1740, the turbocharger inlet guide vanes opened. Thus, the boosting amount is decreased. Thus, according to the present invention, when engine knock cannot be abated using maximum ignition timing retard and the lowest available compression ratio, engine boosting is decreased to abate engine knock.

In an alternative embodiment where a variable geometry turbocharger (vgt) is used, step 1740 can be replaced by step 1740a and 1740b. In step 1740a, the variable geometry turbocharger is adjusted by a predetermined amount Δ1. Then, in step 1740b, the routine waits a predetermined time Δ2.

Thus, according to the present invention, when desired ignition timing is at a maximum allowable spark retard, and desired compression ratio is at a lower potential value, engine boosting is decreased.

Figure 18:
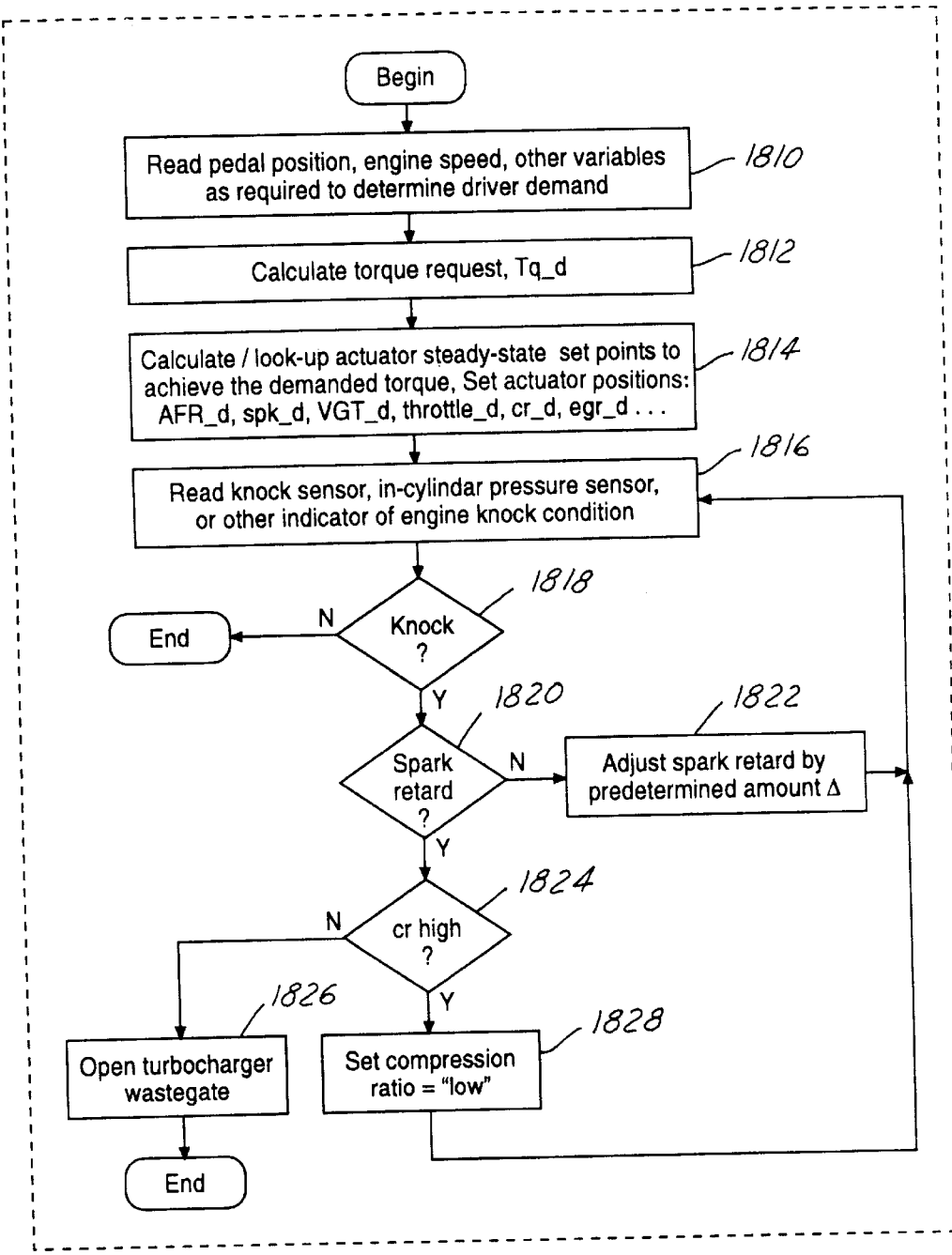

Referring now to FIG. 18, an alternative embodiment is described for an engine with a knock sensor. Steps 1810, 1812, and 1814 are equivalent to steps 1710, 1712, and 1714 of FIG. 17. In step 1816, the knock sensor, or in-cylinder pressure sensor, or other indicator of engine knock, is read. Then, in step 1818, a determination is made as to whether engine knock is present. When the answer to step 1818 is no, the routine ends.

When the answer to step 1818 is yes, the routine continues to step 1820. In step 1820, the routine calculates whether ignition timing is greater than the maximum allowed ignition timing retard. When the answer to step 1820 is no, the routine adjusts ignition retard by a predetermined amount Δ in step 1822 and then continues to step 1816. Otherwise, when the answer to step 1820 is yes, the routine continues to step 1824. In step 1824, a determination is made as to whether the present compression ratio is in the high compression ratio state. When the answer to step 1824 is no, the routine moves to step 1826 where turbocharger waste gate is opened (boosting decreased). Otherwise, when the answer to step 1824 is yes, the compression ratio is set to the low compression ratio state in step 1828, and the routine then returns to step 1816.

Thus, according to the present invention, ignition timing of the engine is retarded to prevent engine knock until the ignition timing reaches a predetermined value. Then, compression ratio is decreased if engine knock still persists. Finally, engine boosting is decreased if engine knock persists even after adjusting compression ratio.

According to the present invention, it is thus possible to minimize engine knock quickly while maintaining engine operation at high efficiency. Further, it is possible to reduce engine knock in systems having multiple devices that affect engine knock while preventing undesirable interaction and degraded performance. Also, the faster actuators are first exhausted before resorting to slower actuators. In particular, those skilled in the art will recognize, in view of the present application, that adjusting engine boosting is slower than adjusting compression ratio or ignition timing. In particular, since adjusting engine boosting has both a turbo lag and a manifold dynamic delay, it has a slower ability to prevent engine knock.

Referring now to FIG. 19, an alternative embodiment is shown for selection of spark timing and compression ratio for optimal fuel economy. Steps 1910, 1912, and 1914 are equivalent to steps 1710, 1712, and 1714 described previously herein with particular reference to FIG. 17. In step 1916, engine state variables and actuator positions required to evaluate the discriminate function are read. Then, in step 1918, the discriminate function is evaluated. Then, in step 1920, a determination is made as to whether a potential for engine knock has been indicated. When the answer to step 1920 is no, the actuator is commanded to the desired positions determined in step 1914 (1921). Otherwise, when the answer to step 1920 is yes, the routine continues to evaluate the discriminate function at maximum allowable spark retard in step 1922.

Next, in step 1924, a determination is made as to whether a potential for engine knock has been indicated. When the answer to step 1924 is yes, the routine continues to step 1926. In step 1926, a determination is made as to whether the desired compression ratio is a high compression ratio value. When the answer to step 1926 is yes, the desired compression ratio is set to a low compression ratio value in step 1928, and the routine continues to step 1922. Otherwise, when the answer to step 1926 is no, the turbocharger waste gate is opened in step 1930 (boosting decrease).

When the answer to step 1924 is no, the routine continues to step 1936 where a determination is made as to whether the desired compression ratio is a high compression ratio value. When the answer to step 1932 is yes, the routine continues to step 1934 where a discriminate function is evaluated at desired spark retard and low compression ratio. Next, a determination is made in step 1936 as to whether a potential for engine knock exists. When the answer to step 1936 is no, a fuel consumption penalty for adjusting ignition timing and compression ratio is evaluated in step 1938. In other words, at this point, either ignition timing or compression ratio can be adjusted to abate the potential for engine knock. To made the determination as to which actuator should be selected, a calculation of the fuel consumption (FC) penalty for each actuator is calculated as:

Fuel economy penalty for switching compression ratio:

$$\nabla_{cr} FC = FC(cr^{high})|_{desired\ spk\ for\ high\ cr} - FC(cr^{low})|_{desired\ spk\ for\ low\ cr}.$$

Fuel economy penalty for on spark timing by staying in High compression:

$$\nabla_{spk} FC = FC(desired\ spk)|_{high\ cr} - FC(req'd\ spk\ to\ prevent\ knock)|_{high\ cr}.$$

Next, In step 1940, a determination is made as to whether the fuel consumption penalty for adjusting, compression ratio is greater than the fuel consumption penalty for adjusting ignition timing. If the answer to step 1940 is yes, compression ratio is commanded to a low compression ratio value and ignition timing is commanded to the desired ignition timing. In other words, when the answer to step 1940 is yes, it is more fuel efficient to first adjust compression ratio to abate engine knock than to adjust ignition timing. When the answer to step 1940 is no, the routine is determined that it is more efficient to first adjust ignition timing than to lower compression ratio.

Continuing with FIG. 19, in step 1944, spark retard is adjusted by a predetermined amount Δ. Then, in step 1946, the discriminate function is evaluated. Then, in step 1948, a determination is made as to whether the potential for engine knock still exists. If the answer to step 1948 is yes, the routine repeats steps 1944 and 1946. Otherwise, when the answer to step 1948 is no, the routine continues to step 1950 and commands the actuators to the desired positions.

Alternatively, step 1944 can be replaced with steps 1944a and 1944b, where the variable geometry turbocharger is adjusted by a predetermined amount Δ3. Then, the routine waits a predetermined time Δ4.

Thus, according to the present invention, it is possible to coordinate the control of ignition timing, compression ratio, and engine boosting while at the same time minimizing engine knock, preventing undesirable interaction, and providing optimal fuel economy.

Thus, accordingly, the routine first adjusts ignition timing, and then adjusts compression ratio. However, in an alternative embodiment, the routine could adjust both the ignition timing and the compression ratio concurrently. In this case, the ignition timing would still be limited to a maximum ignition timing retard.

Further, the routine may give ignition timing a larger range of authority, so as to minimize varying of the compression ratio.

Those skilled in the art will recognized, in view of this disclosure, various other embodiments. For example, a supercharge can be used in place of the turbocharger.

We claim:

1. A system comprising:
   an engine having a variable compression ratio mechanism; and
   a controller operating the system in a first region, and during said operation in said first region:
      detecting engine knock in said first region, and in response to said detection, adjusting ignition timing to abate said detected knock in said first region; and
   operating the system in a second region, and during said operation in said second region:
      detecting engine knock in said second region, and in response to said detection, adjusting compression ratio of said compression ratio mechanism to abate said detected knock in said second region.

2. The system recited in claim 1 further comprising a boosting apparatus coupled to the engine.

3. The system recited in claim 2, said controller further adjusting said boosting apparatus in response to engine knock detected when said engine is operating in a third region.

4. The system recited in claim 1 wherein said first region when ignition timing is retarded less than a predetermined amount.

5. The system recited in claim 2 wherein said boosting apparatus is selected from the group consisting of a turbocharger and a supercharger.

6. The system recited in claim 1 wherein said variable compression ratio mechanism is selected from the group consisting of a two-position compression ratio mechanism and a continuously variable compression ratio mechanism.

7. The system recited in claim 1 wherein said ignition timing is a desired ignition timing.

8. The system recited in claim 1 wherein said first region is when adjusting ignition timing is more fuel efficient than adjusting compression ratio.

9. The system recited in claim 1 wherein said second region is when adjusting compression ratio is more fuel efficient than adjusting ignition timing.

10. The method recited in claim 1 wherein during said operation in said first region, the controller retards retarding ignition timing without changing compression ratio.

11. The method recited in claim 1 wherein during said operation in said second region, the controller adjusts compression ratio without further retarding ignition timing.

12. The method recited in claim 1 wherein said second region is where ignition timing is retarded past a maximum ignition timing retard.

13. The method recited in claim 1 wherein the system operates in said second region after operating in said first region.

14. A method for controlling knock of an internal combustion engine having a variable compression ratio mechanism, the method comprising:

indicating engine knock;

in response to said indication, first adjusting ignition timing to reduce said engine knock;

determining whether engine knock is still indicated, and if so, second adjusting the variable compression ratio mechanism to reduce said engine knock.

15. The method recited in claim 14 further comprising adjusting boosting of the engine to reduce said engine knock.

16. The method recited in claim 14 wherein said indication is based on at least one of a knock sensor and engine operating conditions.

17. The method recited in claim 14 wherein said variable compression ratio mechanism changes effective length of a connecting rod of the engine.

18. The method recited in claim 14 wherein said variable compression ratio mechanism is a two-position device.

* * * * *